United States Patent
Liu

[11] Patent Number: 6,073,741
[45] Date of Patent: Jun. 13, 2000

[54] ONE-WAY ROLLER CLUTCH

[76] Inventor: Kuo-Lung Liu, No. 100, Lane 22, Sec. 1, Hsin Ren Road, Tai-Ping City, Taichung Hsien, Taiwan

[21] Appl. No.: 09/166,566

[22] Filed: Oct. 6, 1998

[51] Int. Cl.$^7$ .................................................. F16D 41/066
[52] U.S. Cl. .......................................... 192/45; 188/82.84
[58] Field of Search ................................. 192/45, 64, 44; 188/82.84

[56] References Cited

U.S. PATENT DOCUMENTS

| | | | |
|---|---|---|---|
| 360,262 | 3/1887 | Wehner | 192/45 |
| 1,193,132 | 8/1916 | Feltz | 192/45 |
| 1,719,881 | 7/1929 | Farmer | 192/45 |
| 2,049,880 | 8/1936 | Winkler | 192/64 |

*Primary Examiner*—Richard M. Lorence
*Attorney, Agent, or Firm*—Browdy and Neimark, PLLC

[57] ABSTRACT

A one-way roller clutch is composed of a drive member having a linking portion and a shaft smaller in diameter than the drive member. The shaft is provided with a plurality of rolling column slots, a fastening portion, and a plurality of protruded portions each being located between two rolling column slots. A connection member is provided in the center thereof with a round hole in which the rolling column slots and the protruded portions are contained. Each rolling column slot is of a progressively open shape relative to the wall of the round hole and is provided therein with a rolling column. A fastening member is fastened with fastening portion of the drive member, and that the connection member is securely fitted over the drive member.

6 Claims, 4 Drawing Sheets

(A)   (B)   (C)

ONE-WAY ROLLER CLUTCH

FIELD OF THE INVENTION

The present invention relates generally to a roller clutch, and more particularly to a one-way roller clutch.

BACKGROUND OF THE INVENTION

As shown in FIG. 1, a one-way roller clutch of the prior art is composed of a drive member 1 which is provided at one end thereof with a shaft 2 of a smaller diameter, a connection member 3 having a round hole 4 which is provided in the inner wall thereof with a plurality of rolling column slots 5. The shaft 2 of the drive member 1 is received in the round hole 4 of the connection member 3. A rolling column 6 and a spring 7 are located in the space defined by the rolling column slots 5 and the shaft 2, as shown in FIG. 2. The spring 7 is intended to provide an elastic force for pushing the rolling columns 6 toward the narrow ends of the rolling column slots 5.

When the drive member 1 is turned counterclockwise in relation to the connection member 3, each rolling column 6 is actuated to move towards the narrow end of the rolling column slot S such that the rolling column 6 is retained between the rolling column slot 5 and the shaft 2, so as to prevent the drive member 2 and the connection member 3 from turning in relation to each other. In other words, the connection member 3 turns along with the drive member 1. When the drive member 1 is actuated to rotate clockwise in relation to the connection member 3, each rolling column 5 is actuated to move towards the wider end of the rolling column slot 5. As a result, no retaining action is brought about. The connection member 3 does not rotate along with the drive member 1. The drive member 1 is thus capable of a one-way drive of the connection member 3.

The finishing of the rolling column slot 5 of the one-way roller clutch of the prior art described above involves the formation of a round hole (a) in the closed end of the connection member 3, as shown in FIG. 3. The round hole (a) is then provided in the inner wall thereof with a plurality of recesses (b) by cutter turning, as shown in FIG. 3B. The recesses (b) are then machined by broach to form the rolling column slot 5 of a progressively open shape, as shown in FIG. 3C, for disposing respectively the rolling column 6 and the spring 7. It is therefore readily apparent that the process of making the one-way roller clutch of the prior art is excessively complicated, and that the rejection rate of the one-way roller clutch of the prior art is high, and further that the one-way roller clutch of the prior art is not cost-effective.

SUMMARY OF THE INVENTION

The primary objective of the present invention is therefore to provide an improved one-way roller clutch which is simple in construction and can be thus made handily.

In keeping with the principle of the present invention, the foregoing objective of the present invention is attained by the one-way roller clutch which is composed of a drive member having a linking portion and a shaft of a smaller diameter. The shaft is provided in the outer periphery thereof with a plurality of rolling column slots, and at one end thereof with a fastening portion. Located between two adjoining rolling slots is a protruded portion. A connection member is provided in the center thereof with a round hole in which the rolling column slots and the protruded portions are located. Each rolling column slot of the drive member is of a progressively open shape in relation to the wall of the round hole and is provided therein with a rolling column. A fastening member is fastened with the fastening portion of the drive member such that the connection member is urged by the fastening member, and that the connection member is securely fitted over the drive member The detailed structures, features and functions of the present invention will be more readily understood upon a thoughtful deliberation of the following detailed description of the present invention with reference to the accompanying drawings.

DETAILED DESCRIPTION OF THE INVENTION

Figure 1:
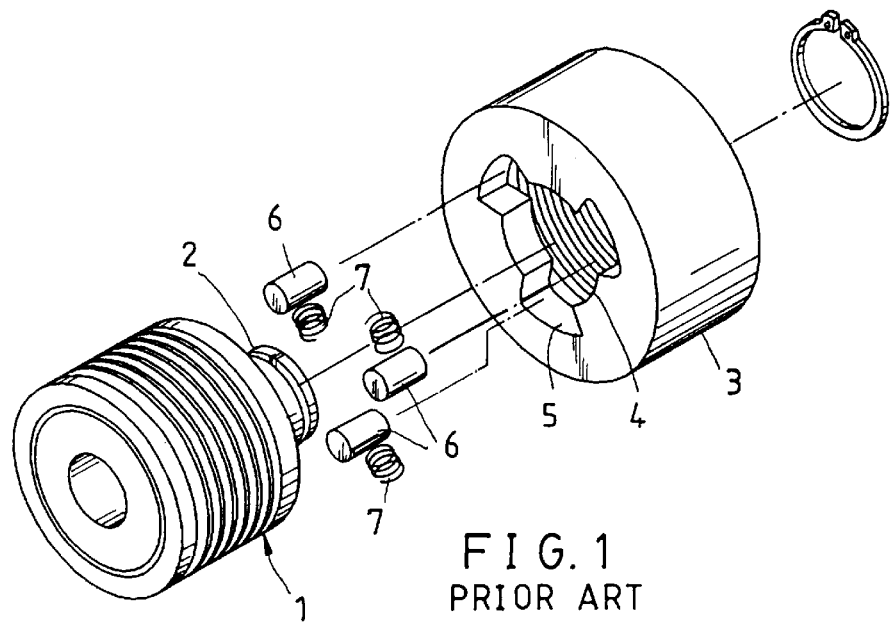
FIG. 1 shows an exploded view of a one-way roller clutch of the prior art.
Figure 2:
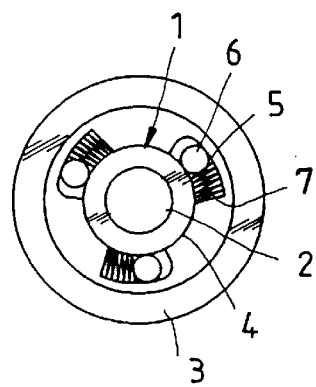
FIG. 2 shows a schematic view of the one-way roller clutch of the prior art in combination.
Figure 3:
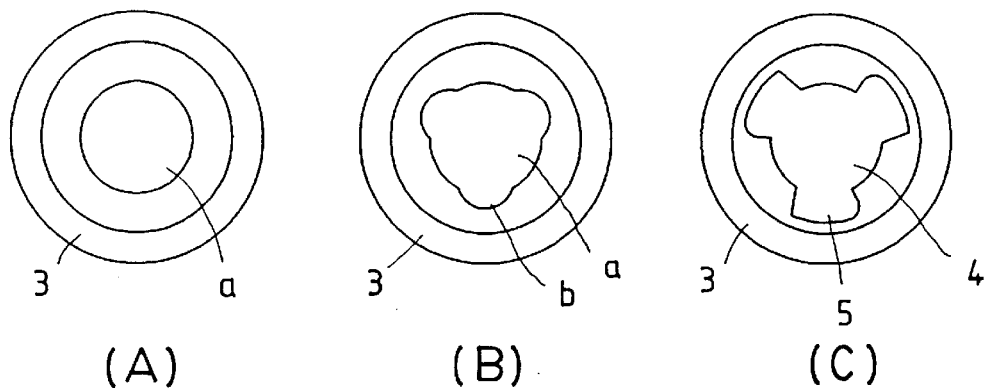
FIGS. 3A–C show a schematic view of the process of making the connection member of the one-way roller clutch of the prior art.
Figure 4:
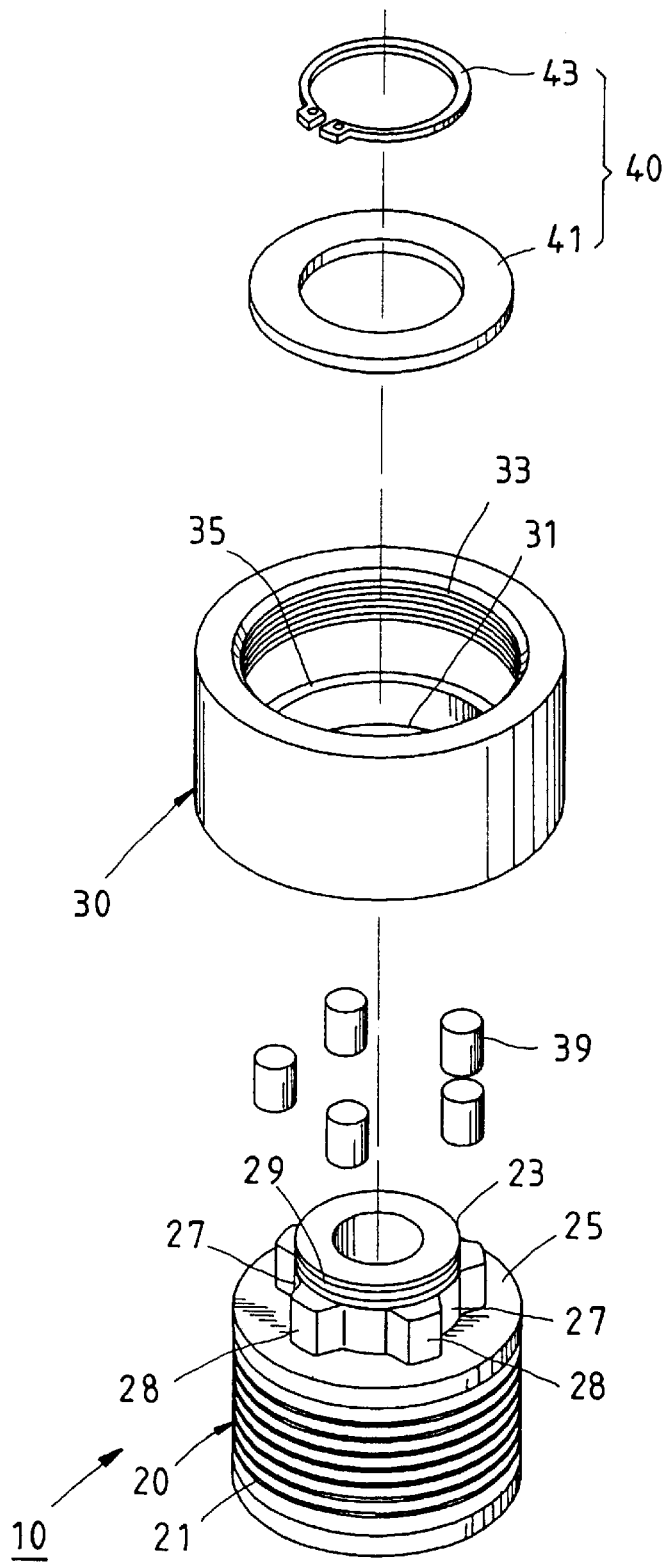
FIG. 4 shows an exploded view of a preferred embodiment of the present invention.
Figure 5:
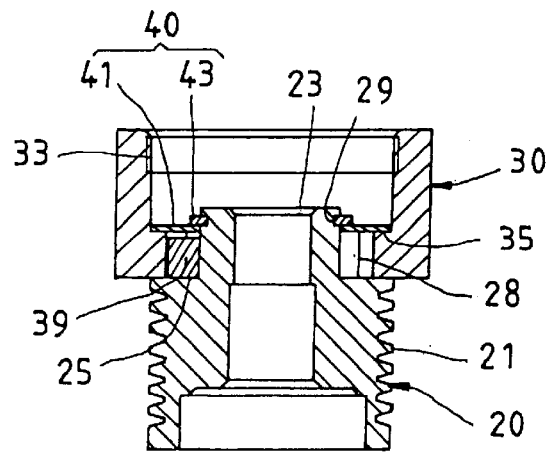
FIG. 5 shows a longitudinal sectional view of the preferred embodiment of the present invention in combination.

As shown in FIGS. 4 and 5, a one-way roller clutch 10 embodied in the present invention is composed of a drive member 20, a connection member 30 fitted over the drive member 20, and a fastening member 40 for holding the connection member 30 securely in place.

The drive member 20 is of a round columnar construction and is provided in the periphery thereof with a linking portion 21, which is composed of a plurality of V-shaped slots in the embodiment of the present invention and is capable of cooperating with a slotted belt (not shown in the drawing). A shaft 23 is fastened coaxially with one end of the drive member 20 and is smaller in diameter than the drive member 20. Located between the shaft 23 and the linking portion 21 is a shoulder 25. The shaft 23 is provided in the outer periphery thereof with a plurality of rolling column slots 27 which are arranged equidistantly. A protruded portion 28 is formed between the rolling column slots 27. A fastening portion 29, which is an insertion slot in this embodiment of the present invention, is located in the free end edge of the shaft 23.

The connection member 30 is of a round columnar construction and is provided at one end thereof with an opening. The connection member 30 is provided at the closed end thereof with a round hole 31 located at the center thereof and fitted over the shaft 23 of the drive member 20 in such a way that the round hole 31 contains the rolling column slots 27 and the protruded portions 28. The shoulder 25 is urged by the end edge of the round hole 31 of the connection member 30. The rolling column slots 27 have a cross section which is of a progressively open shape in relation to the periphery of the round hole 31. An area defined by each rolling column slot 27 and the connection member 30 has one end which is narrower than other end thereof. The rolling column slots 27 are equal in number to the rolling columns 39 which are disposed in the rolling column slots 27 such that each rolling column 39 is confined by the shoulder 25, and that each rolling column 39 is thus prevented from falling out of the rolling column slot 27. The connection member 30 is provided in the inner wall thereof with a connection portion 33, which is a threaded portion in this embodiment of the present invention, for fastening a fly wheel or other object (not shown in the drawing).

The fastening member 40 consists of a circular pad 41 and a C-shaped clamp 43. The circular pad 41 is engaged with the shaft 23 via the connection member 30 such that the rolling column slots 27 are covered by the circular pad 41, and that the peripheral edge of the circular pad 41 is located in a stepped portion 35 which is located in the inner wall of the connection member 30. The C-shaped clamp 43 is used to hold the fastening portion 23 of the drive member 20. The fastening portion 23 urges the circular pad 41. The circular pad 41 and the connection member 30 are thus kept securely in place on the drive member 20. The circular pad 41 is used to prevent the rolling columns 39 from falling out of the rolling column slots 27.

Figure 6:
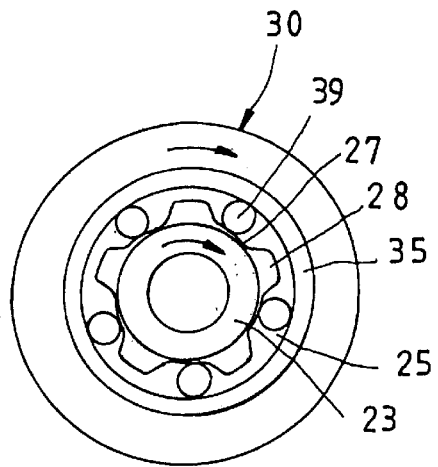
FIG. 6 shows a schematic view of the working relationship between the rolling columns and the connection member of the present invention at the time when the drive member rotates clockwise.
Figure 7:
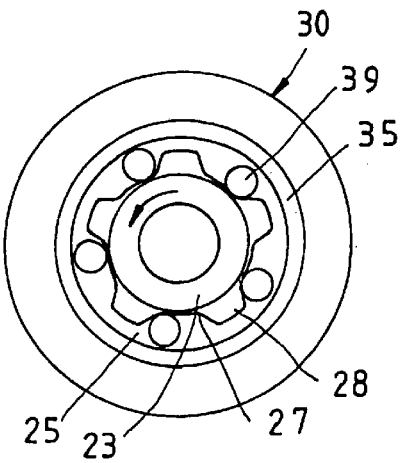
FIG. 7 shows a schematic view of the working relationship between the rolling columns and the connection member of the present invention at the time when the drive member rotates counterclockwise.

As shown in FIG. 6, when the drive member 20 is actuated to rotate clockwise in relation to the connection member 30, each rolling column 39 is actuated to move towards the narrow end of the rolling column slot 27 such that the rolling column 39 is stopped between the rolling column slot 27 and the drive member 20 for preventing the connection member 30 from turning in relation to the drive member 20. In other words, when the drive member 20 keeps on turning clockwise, the connection member 30 is driven to turn in the same direction in which the drive member 20 turns, so as to facilitate the rotating of a fly wheel. Now referring to FIG. 7, when the drive member 20 is driven to turn counter clockwise in relation to the connection member 30, each rolling column 39 is actuated to move towards the wide end of the rolling column slot 27, without being stopped between the drive member 20 and the connection member 30. In other words, the connection member 30 does not rotate along with the drive member 20. The drive member 20 is capable of actuating the connection member 30 to turn in a one-way manner.

Figure 9:
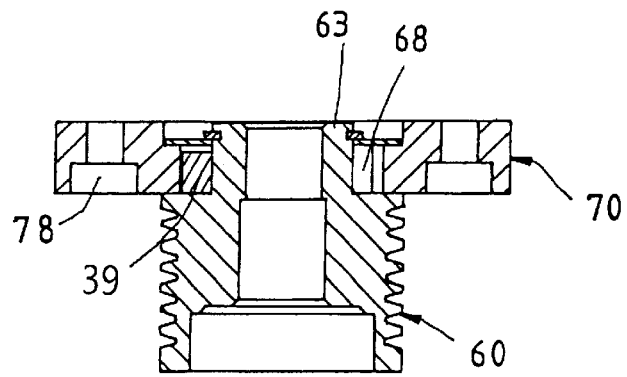
FIG. 9 shows a longitudinal sectional view of the another preferred embodiment of the present invention.
Figure 8:
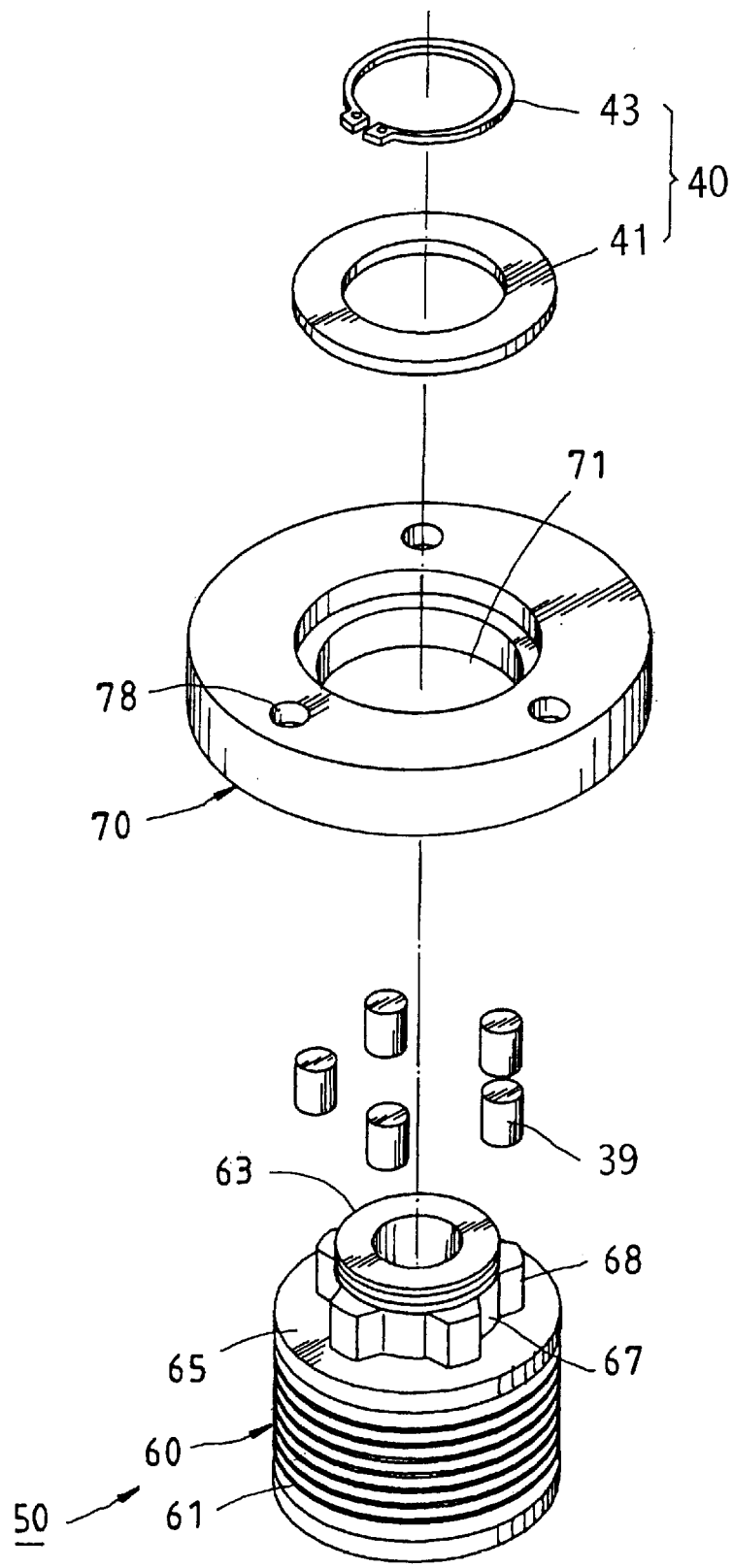
FIG. 8 shows an exploded view of another preferred embodiment of the present invention.

As shown in FIGS. 8 and 9, a one-way bearing 50 of another preferred embodiment of the present invention is similar in construction to the one-way bearing 10 of the first preferred embodiment of the present invention, except that the former consists of a connection member 70 which is greater in diameter than the drive member 60 and is provided with a disklike body of a predetermined thickness. Elements in FIGS. 8 and 9 identical to those in the first preferred embodiment are similarly labeled in the drawings. The connection member 70 is provided in the center thereof with a round hole 71 in which the shaft 63 of the drive member 60 is received along with the rolling column slots 67 and the protruded portions 68. The shoulder 65 is urged by the end edge of the round hole 71. The connection member 70 is provided in the outer periphery thereof with an outer smooth portion and three connection portions 78 (fish eye holes) located in the outer smooth portion for connecting other device in conjunction with screws (not shown in the drawings).

The operation of the second preferred embodiment of the present invention is the same as that of the first preferred embodiment of the present invention.

The linking portion 21 of the present invention may be formed of a plurality of circular slots or a circular slot having a V-shaped cross section and engageable with a V-shaped belt. The linking portion 21 of the present invention may be a gear engageable with other gears or chains.

The rolling column slots 27 of the present invention are exposed and can be thus formed by extrusion from one end of the drive member 20. No further finishing is called for after the formation of the rolling column slots 27. The present invention is therefore relatively cost-effective and low in rejection rate.

What is claimed is:

1. A one-way roller clutch comprising:

a drive member of a round columnar construction and provided in a periphery thereof with a linking portion, said drive member provided at one end thereof with a shaft smaller in diameter than said drive member, said shaft provided in an outer periphery thereof with a plurality of rolling column slots, and a plurality of protruded portions each being located between two rolling column slots, said shaft provided at one end edge thereof with a fastening portion;

a connection member provided in a center thereof with a round hole, said drive member being received in said round hole of said connection member such that said rolling column slots and said protruded portions are contained in said round hole, said rolling column slots of said drive member being of a progressively open shape relative to an inner wall of said round hole, said connection member further provided in a predetermined portion thereof with a connection portion;

a plurality of rolling columns equal in number to said rolling column slots and disposed respectively in said rolling column slots; and a fastening member fastened with said fastening portion of said drive member such that said connection member is urged by said fastening member so as to hold said connection member securely in place on said drive member.

2. The one-way roller clutch as defined in claim 1, wherein said connection member is of a round columnar construction and provided at one end thereof with an opening which is provided in an inner wall thereof with threads.

3. The one-way roller clutch as defined in claim 1, wherein said connection member is greater in diameter than said drive member and is provided with a disklike body of a predetermined thickness, said connection member further provided with an outer smooth portion; and wherein said connection portion of said connection member is located in said outer smooth portion.

4. The one-way roller clutch as defined in claim 1, wherein said linking portion of said drive member is formed of a plurality of circular slots having a V-shaped cross section.

5. The one-way roller clutch as defined in claim 1, wherein said linking portion of said drive member is formed of a circular slot having a V-shaped cross section.

6. The one-way roller clutch as defined in claim 1, wherein said linking portion of said drive member is a gear.

* * * * *